United States Patent
Sasaki

(10) Patent No.: US 12,229,457 B2
(45) Date of Patent: Feb. 18, 2025

(54) IMAGE FORMING APPARATUS, INFORMATION PROCESSING METHOD, AND NON-TRANSITORY RECORDING MEDIUM

(71) Applicant: Tohru Sasaki, Kanagawa (JP)

(72) Inventor: Tohru Sasaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/514,101

(22) Filed: Nov. 20, 2023

(65) Prior Publication Data

US 2024/0211189 A1    Jun. 27, 2024

(30) Foreign Application Priority Data

Dec. 23, 2022  (JP) .................................. 2022-207277
Sep. 25, 2023  (JP) .................................. 2023-161668

(51) Int. Cl.
   *G06F 3/12*    (2006.01)

(52) U.S. Cl.
   CPC .......... *G06F 3/1243* (2013.01); *G06F 3/1255* (2013.01); *G06F 3/1256* (2013.01); *G06F 3/1257* (2013.01); *G06F 3/1265* (2013.01); *G06F 3/1279* (2013.01)

(58) Field of Classification Search
   CPC .... G06F 3/1243; G06F 3/1255; G06F 3/1256; G06F 3/1257; G06F 3/1265; G06F 3/1279
   See application file for complete search history.

(56) References Cited

U.S. PATENT DOCUMENTS

| | | | |
|---|---|---|---|
| 2007/0263240 A1* | 11/2007 | Hirai | G06K 15/02 358/1.11 |
| 2011/0222107 A1* | 9/2011 | Williams | G06F 3/1247 358/1.15 |
| 2013/0329253 A1 | 12/2013 | Sasaki | |
| 2015/0206035 A1* | 7/2015 | Yamashita | G06K 15/005 358/1.9 |
| 2015/0271353 A1 | 9/2015 | Nishimura et al. | |
| 2016/0080588 A1 | 3/2016 | Sasaki et al. | |
| 2016/0371039 A1* | 12/2016 | Mizuno | G06F 3/1234 |
| 2018/0275926 A1 | 9/2018 | Sasaki | |
| 2019/0116277 A1* | 4/2019 | Naruhn | G06F 3/1292 |
| 2022/0124217 A1 | 4/2022 | Sasaki | |
| 2022/0263977 A1* | 8/2022 | Kobashi | H04N 1/6008 |

FOREIGN PATENT DOCUMENTS

| | | |
|---|---|---|
| JP | 2002-007078 A | 1/2002 |
| JP | 2005-144970 A | 6/2005 |
| JP | 2019-067028 A | 4/2019 |
| JP | 2020-177278 A | 10/2020 |

* cited by examiner

*Primary Examiner* — John R Wallace
(74) *Attorney, Agent, or Firm* — IPUSA, PLLC

(57) ABSTRACT

An image forming apparatus includes an image forming device and circuitry. The circuitry acquires output information of printing from image information, acquires a setting condition related to a usable printing function, determines whether to correct the output information, based on the setting condition, corrects the output information, based on a determined result and the setting condition, receives an operation of requesting execution of printing from a user, and cause the image forming device to execute printing, based on the output information and a request from the user.

12 Claims, 12 Drawing Sheets

| KEY | MEANING OF KEY | VALUE AFTER CORRECTION |
|---|---|---|
| url | URL OF STORAGE LOCATION OF DOCUMENT TO BE OUTPUT | https://cloudstorage.com/doc/sample.pdf |
| pattern | OUTPUT PATTERN 1 | simple |
| setting | PRINT SETTING FOR OUTPUT PATTERN 1 | prn_mono |
| | | single-sided (CORRECTED VALUE) |
| | | 1-2 |
| pattern | OUTPUT PATTERN 2 | detail |
| setting | PRINT SETTING FOR OUTPUT PATTERN 2 | prn_mono (CORRECTED VALUE) |
| | | staple |
| | | single-sided (CORRECTED VALUE) |
| | | 1- |

FIG. 8A

| url, https://cloudstorage.com/doc/sample.pdf, pattern, simple, required, duplex, setting, prn_mono, 1-2, pattern, detail, required, prn_color, setting, staple, duplex, 1-, |
|---|

FIG. 8B

| KEY | MEANING OF KEY | VALUE | MEANING OF VALUE |
|---|---|---|---|
| url | STORAGE LOCATION OF FILE TO BE PRINTED | https://cloudstorage.com/doc/sample.pdf | URL OF STORAGE LOCATION OF FILE |
| pattern | OUTPUT PATTERN 1 | simple | PATTERN OF PRINTING DOCUMENT SIMPLY |
| required | (REQUIRED) PRINT SETTING FOR OUTPUT PATTERN 1 | duplex | DUPLEX PRINTING |
| setting | (RECOMMENDED) PRINT SETTING FOR OUTPUT PATTERN 1 | prn_mono | MONOCHROME PRINTING |
| | | 1-2 | PAGES TO BE PRINTED (PAGES 1 TO 2 ARE TO BE PRINTED) |
| pattern | OUTPUT PATTERN 2 | detail | PATTERN OF PRINTING DOCUMENT IN DETAIL |
| required | (REQUIRED) PRINT SETTING FOR OUTPUT PATTERN 2 | prn_color | COLOR PRINTING |
| setting | (RECOMMENDED) PRINT SETTING FOR OUTPUT PATTERN 2 | staple | STAPLING ENABLED |
| | | duplex | DUPLEX PRINTING |
| | | 1- | PAGES TO BE PRINTED (ALL PAGES ARE TO BE PRINTED) |

FIG. 9

| FUNCTION OF IMAGE FORMING APPARATUS | | DESCRIPTION ABOUT FUNCTION | IDENTIFIER INDICATING FUNCTION |
|---|---|---|---|
| PRINT | COLOR | COLOR PRINTING FUNCTION IS USABLE. | prn_color |
| | MONOCHROME | MONOCHROME PRINTING FUNCTION IS USABLE. | prn_mono |
| COPY | FULL-COLOR/TWO-COLOR/SINGLE-COLOR/MONOCHROME | FULL-COLOR/TWO-COLOR/SINGLE-COLOR/MONOCHROME COPY FUNCTION IS USABLE. | cpy_color |
| | TWO-COLOR/SINGLE-COLOR/MONOCHROME | TWO-COLOR/SINGLE-COLOR/MONOCHROME COPY FUNCTION IS USABLE. | cpy_twin |
| | SINGLE-COLOR/MONOCHROME | SINGLE-COLOR/MONOCHROME COPY FUNCTION IS USABLE. | cpy_single |
| | MONOCHROME | MONOCHROME COPY FUNCTION IS USABLE. | cpy_mono |
| FAX | | FAX FUNCTION IS USABLE. | fax |
| SCANNER | | SCANNER FUNCTION IS USABLE. | scan |

FIG. 10

| FUNCTION OF PERIPHERAL DEVICE | DESCRIPTION | IDENTIFIER INDICATING FUNCTION |
|---|---|---|
| STAPLE | OUTPUT DOCUMENT CAN BE STAPLED. | staple |
| PUNCH | OUTPUT DOCUMENT CAN BE PUNCHED. | punch |
| SHEET FOLDING | OUTPUT DOCUMENT CAN BE HALF-FOLDED OR Z-FOLDED. | fold |
| SINGLE-SIDED PRINTING | SINGLE-SIDED PRINTING OF OUTPUT DOCUMENT CAN BE PERFORMED. | single-sided |
| DUPLEX PRINTING | DUPLEX PRINTING OF OUTPUT DOCUMENT CAN BE PERFORMED. | duplex |
| CHARGING | CHARGING FOR PRINTING CAN BE PERFORMED. | charge |
| ... | | ... |

FIG. 11

| USER ID | FUNCTION FOR WHICH USER HAS USE PRIVILEGE |
|---|---|
| user1 | prn_color, cpy_color, scan |
| user2 | prn_mono, cpy_twin, fax, scan |
| user3 | cpy_mono, fax |
| ... | |

FIG. 12A

| FUNCTION RELATED TO PRINTING | IDENTIFIER INDICATING FUNCTION |
|---|---|
| COLOR | prn_color |
| MONOCHROME | prn_mono |
| STAPLE | staple |
| SINGLE-SIDED PRINTING | single-sided |

FIG. 12B

| USER ID | FUNCTION FOR WHICH USER HAS USE PRIVILEGE |
|---|---|
| user2 | prn_mono, single-sided, cpy_twin, fax, scan |

FIG. 12C

| KEY | MEANING OF KEY | VALUE |
|---|---|---|
| url | URL OF STORAGE LOCATION OF DOCUMENT TO BE OUTPUT | https://cloudstorage.com/doc/sample.pdf |
| pattern | OUTPUT PATTERN 1 | simple |
| setting | PRINT SETTING FOR OUTPUT PATTERN 1 | prn_mono |
| | | duplex |
| | | 1-2 |
| pattern | OUTPUT PATTERN 2 | detail |
| setting | PRINT SETTING FOR OUTPUT PATTERN 2 | prn_color |
| | | staple |
| | | duplex |
| | | 1- |

FIG. 13

| KEY | MEANING OF KEY | VALUE AFTER CORRECTION |
|---|---|---|
| url | URL OF STORAGE LOCATION OF DOCUMENT TO BE OUTPUT | https://cloudstorage.com/doc/sample.pdf |
| pattern | OUTPUT PATTERN 1 | simple |
| setting | PRINT SETTING FOR OUTPUT PATTERN 1 | prn_mono |
| | | single-sided (CORRECTED VALUE) |
| | | 1-2 |
| pattern | OUTPUT PATTERN 2 | detail |
| setting | PRINT SETTING FOR OUTPUT PATTERN 2 | prn_mono (CORRECTED VALUE) |
| | | staple |
| | | single-sided (CORRECTED VALUE) |
| | | 1- |

IMAGE FORMING APPARATUS, INFORMATION PROCESSING METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application Nos. 2022-207277, filed on Dec. 23, 2022, and 2023-161668, filed on Sep. 25, 2023, in the Japan Patent Office, the entire disclosure of which is hereby incorporated by reference herein.

BACKGROUND

Technical Field

The present disclosure relates to an image forming apparatus, an information processing method, and a non-transitory recording medium.

Related Art

A document file stored in a storage device connected to an image forming apparatus or stored with a storage service over a cloud network may be designated and printed using a function of the image forming apparatus such as color printing or duplex printing. For example, a technique is disclosed that determines whether to permit printing of a document file on the basis of position information of the image forming apparatus and area setting information that is obtained from a digital watermark embedded in the document file.

SUMMARY

According to an embodiment of the present disclosure, an image forming apparatus includes an image forming device and circuitry. The circuitry acquires output information of printing from image information, acquires a setting condition related to a usable printing function, determines whether to correct the output information, based on the setting condition, corrects the output information, based on a determined result and the setting condition, receives an operation of requesting execution of printing from a user, and cause the image forming device to execute printing, based on the output information and a request from the user.

According to an embodiment of the present disclosure, an information processing method includes acquiring output information of printing from image information; acquiring a setting condition related to a usable printing function; determining whether to correct the output information, based on the setting condition; correcting the output information, based on a determined result in the determining and the setting condition; receiving an operation of requesting execution of printing from a user; and executing printing, based on the output information and a request from the user.

According to an embodiment of the present disclosure, a non-transitory recording medium storing a plurality of instructions which, when executed by one or more processors, cause the processors to perform an information processing method. The information processing method includes acquiring output information of printing from image information; acquiring a setting condition related to a usable printing function; determining whether to correct the output information, based on the setting condition; correcting the output information, based on a determined result in the determining and the setting condition; receiving an operation of requesting execution of printing from a user; and executing printing, based on the output information and a request from the user.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIGS. 8A and 8B are diagrams for describing output information included in image information according to some embodiments of the present disclosure;

FIG. 9 is a diagram for describing functions of the image forming apparatus of FIG. 2 according to some embodiments of the present disclosure;

FIG. 10 is a diagram for describing functions of a peripheral device according to some embodiments of the present disclosure;

FIG. 11 is a diagram illustrating information related to a privilege of a user to use a function according to some embodiments of the present disclosure;

FIGS. 12A, 12B, and 12C are diagrams for describing a determination of whether to correct output information according to some embodiments of the present disclosure;

FIG. 13 is a diagram for describing correction of output information according to some embodiments of the present disclosure;

Figure 1:
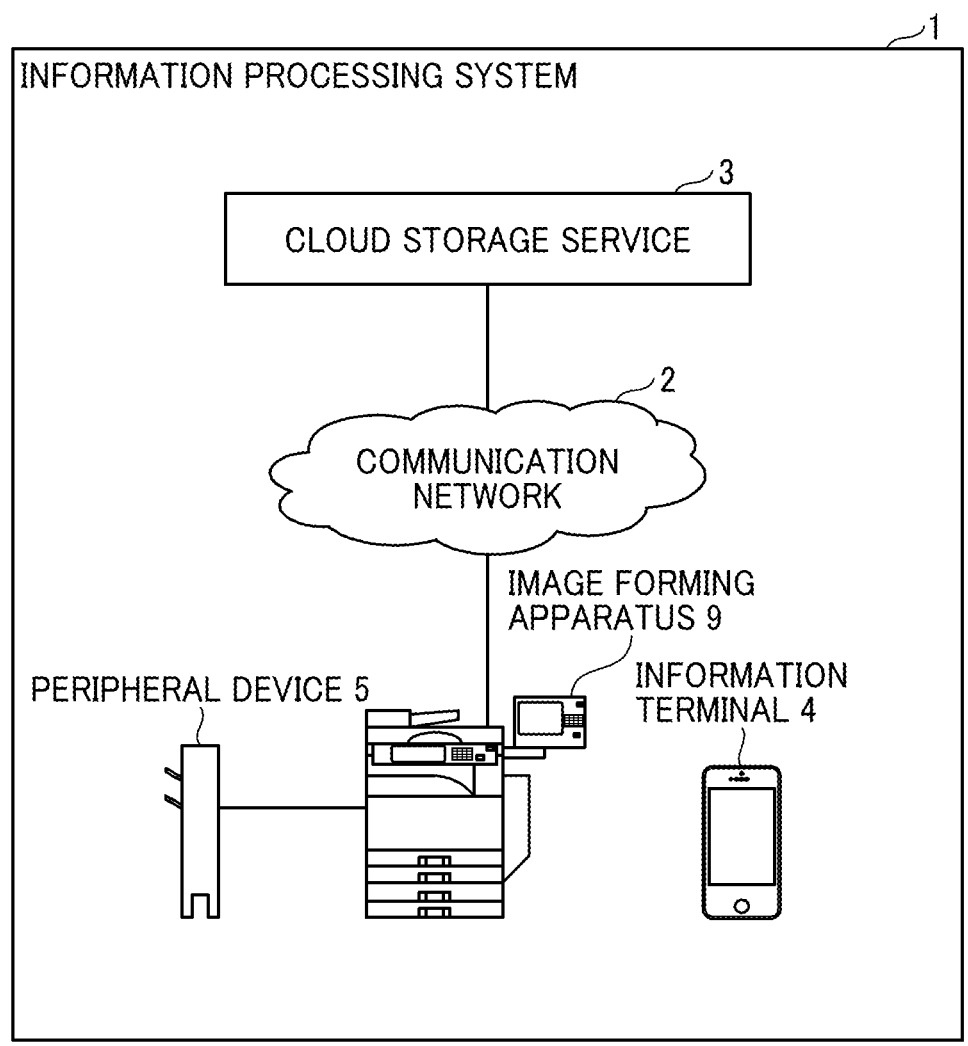
FIG. 1 is a schematic diagram illustrating an information processing system according to some embodiments of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiment

System Overview

FIG. 1 is a schematic diagram illustrating an information processing system according to an embodiment of the present disclosure. An information processing system 1 includes, for example, an image forming apparatus 9 and a cloud storage service 3 that are connected to a communication network 2 such as the Internet. The information processing system 1 may also include a peripheral device 5 connected to the image forming apparatus 9, and an information terminal 4 such as a smartphone that communicates with the image forming apparatus 9.

The image forming apparatus 9 displays, for example, a selection screen that allows a user to select an output pattern of printing on the basis of output information of printing and a setting condition. The output information is included in image information such as a two-dimensional code. The setting condition includes information related to a printing function usable in the image forming apparatus 9 and information related to a privilege of the user to use a function (or functions). The image information and the output information include a plurality of output patterns each including a storage location of a file such as a document file to be printed, a to-be-printed page (or to-be-printed pages) of the file, and information related to print settings such as color printing and duplex printing. The selection screen displays two kinds of output patterns to be selected by the user. The output patterns include, for example, a simple output pattern for performing printing to view a document file simply and a detailed output pattern for performing printing to view the document file in detail. The settings included in the output information may include a required setting depending on content of the document to be printed. For example, in the case of a document using a graph with different colors, printing the document in monochrome makes the colors no longer be distinguished from each other and thus makes the graph useless. Therefore, color printing is a required setting. For example, in the case of data that is to be printed in a defined size recommended by a provider, such as map data including small symbols and text, data for a poster, and data of a resume format, a requested printing sheet size (A3 size, for example) is a required setting. The cloud storage service 3 stores a file to be printed by the image forming apparatus 9, and transmits the file to the image forming apparatus 9 in response to a request from the image forming apparatus 9. Note that in the present embodiment, the file to be printed is not limited to a file stored in the cloud storage service 3 and may be, for example, a file stored in a storage device of the image forming apparatus 9 or an external storage device connected to the image forming apparatus 9.

The peripheral device 5 is a device connected to the image forming apparatus 9. The peripheral device 5 provides printing-related functions such as a staple function, a punch function, a sheet folding function, and a duplex printing function. The peripheral device 5 may also provide a function related to charging for printing.

The information terminal 4 is connected to the image forming apparatus 9 via, for example, short-range communication such as Bluetooth®. In response to a user operation, the information terminal 4 transmits, to the image forming apparatus 9, image information such as a two-dimensional code captured by a camera. The information terminal 4 displays, on a screen of the information terminal 4, the selection screen for selecting a printing output pattern on the basis of the information received from the image forming apparatus 9, and transmits a result selected by the user to the image forming apparatus 9. In other words, the user can use the information terminal 4 instead of a touch panel of the image forming apparatus 9 to perform an operation for printing.

As described above, the information processing system 1 allows the user to select an output pattern displayed on the selection screen displayed by the image forming apparatus 9 to perform printing without the user making detailed print settings.

Note that the system configuration of the information processing system 1 illustrated in FIG. 1 is an example. For example, the communication network 2 may include a connection section based on mobile communication or wireless communication such as a wireless local area network (LAN). Instead of the peripheral device 5 providing some functions, the image forming apparatus 9 may have all the functions and the peripheral device 5 may not be used. One of or both of the cloud storage service 3 and the information terminal 4 may be omitted in the information processing system 1.

Example of Hardware Configuration (Image Forming Apparatus 9)

Figure 2:
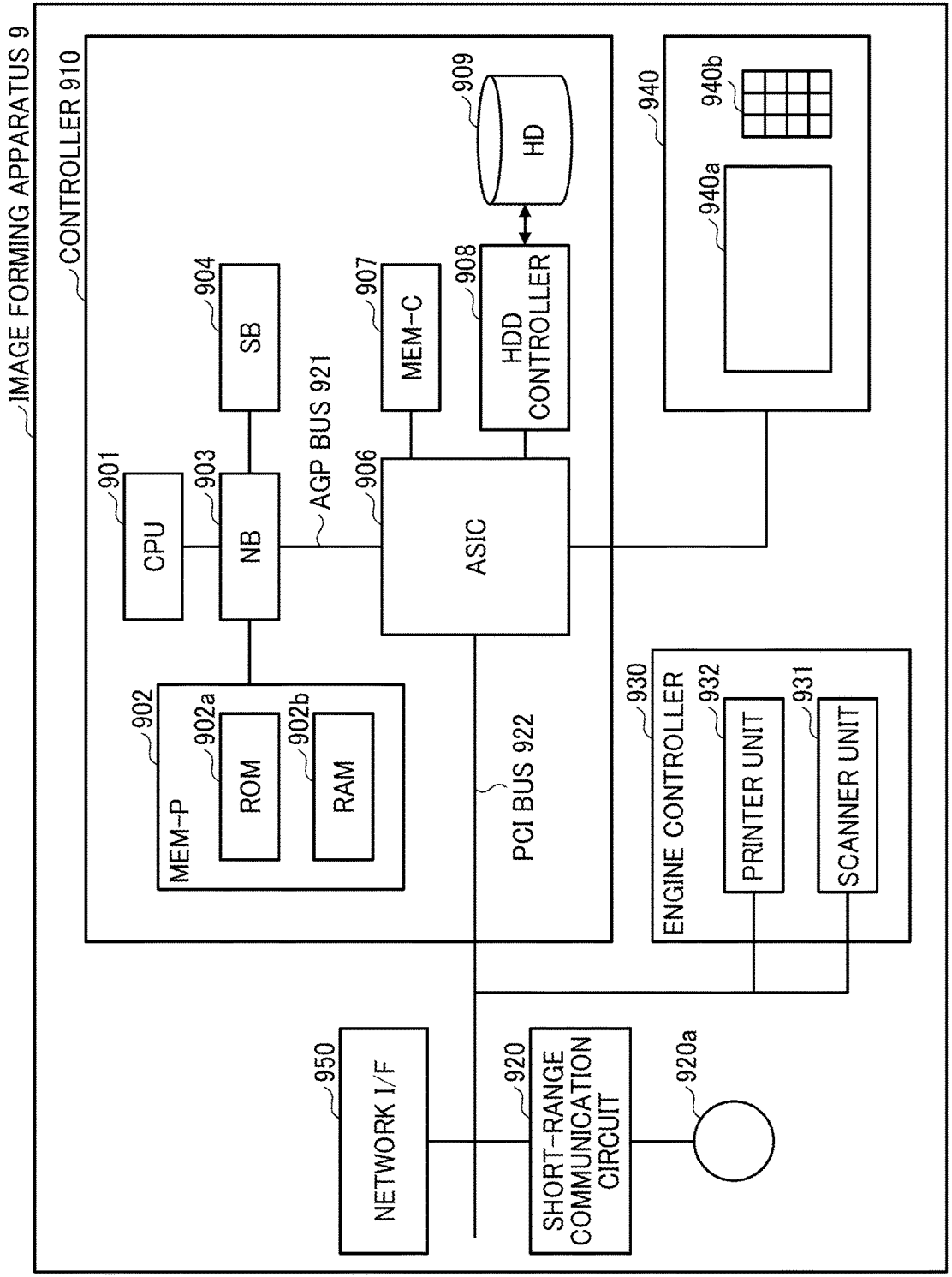
FIG. 2 is a block diagram illustrating a hardware configuration of an image forming apparatus according to some embodiments of the present disclosure.

FIG. 2 is a diagram illustrating a hardware configuration of the image forming apparatus 9 according to the present embodiment of the present disclosure. As illustrated in FIG. 2, the image forming apparatus 9 (or called a multifunction peripheral/product/printer (MFP)) includes a controller 910, a short-range communication circuit 920, an engine controller 930, an operation panel 940, and a network interface (I/F) 950.

The controller 910 includes a central processing unit (CPU) 901 as a main processor, a system memory (MEM-P) 902, a north bridge (NB) 903, a south bridge (SB) 904, an application specific integrated circuit (ASIC) 906, a local memory (MEM-C) 907, a hard disk drive (HDD) controller 908, and an a hard disk (HD) 909. The NB 903 and the ASIC 906 are connected by an accelerated graphics port (AGP) bus 921.

The CPU 901 controls the entire image forming apparatus 9. The NB 903 connects the CPU 901 to the MEM-P 902, the SB 904, and the AGP bus 921. The NB 903 includes a memory controller for controlling reading or writing of various data from or to the MEM-P 902, a Peripheral Component Interconnect (PCI) master, and an AGP target.

The MEM-P 902 includes a read-only memory (ROM) 902a as a memory that stores a program and data for implementing various functions of the controller 910. The MEM-P 902 further includes a random access memory (RAM) 902b as a memory to which the program and data are loaded or as a rendering memory that stores data rendered for printing. The program stored in the RAM 902b may be stored in any computer-readable recording medium, such as a compact disc-read only memory (CD-ROM), compact disc-recordable (CD-R), or digital versatile disc (DVD), in an installable or executable file format for distribution.

The SB 904 connects the NB 903 to a PCI device or a peripheral device. The ASIC 906 is an integrated circuit (IC) dedicated to an image processing use and including hardware elements for image processing, and connects the AGP bus 921, a PCI bus 922, the HDD controller 908, and the MEM-C 907 to each other. The ASIC 906 includes a PCI target, an AGP master, an arbiter (ARB) as a central processor of the ASIC 906, a memory controller, a plurality of direct memory access controllers (DMACs), and a PCI unit. The memory controller controls the MEM-C 907. The DMACs perform rotation of image data with a hardware logic. The PCI unit transfers data to a scanner unit 931 and a printer unit 932 through the PCI bus 922. The ASIC 906 may be connected to a Universal Serial Bus (USB) interface, or an Institute of Electrical and Electronics Engineers 1394 (IEEE 1394) interface. The engine controller 930 includes the scanner unit 931 that controls a scanner, and the printer unit 932 that controls a plotter such as a printer. The engine controller 930 controls a device (referred to as an image forming device) related to various image forming functions of the image forming apparatus 9. The image forming device is, for example, a general scanner or printer.

The short-range communication circuit 920 includes a card reader 920a for reading authentication information of a user stored in an IC card.

The operation panel 940 includes a touch panel 940a and a numeral keypad 940b that receive input from the user. The touch panel 940a displays a screen of an application executed by the image forming apparatus 9.

Example of Hardware Configuration (Information Terminal 4)

Figure 3:
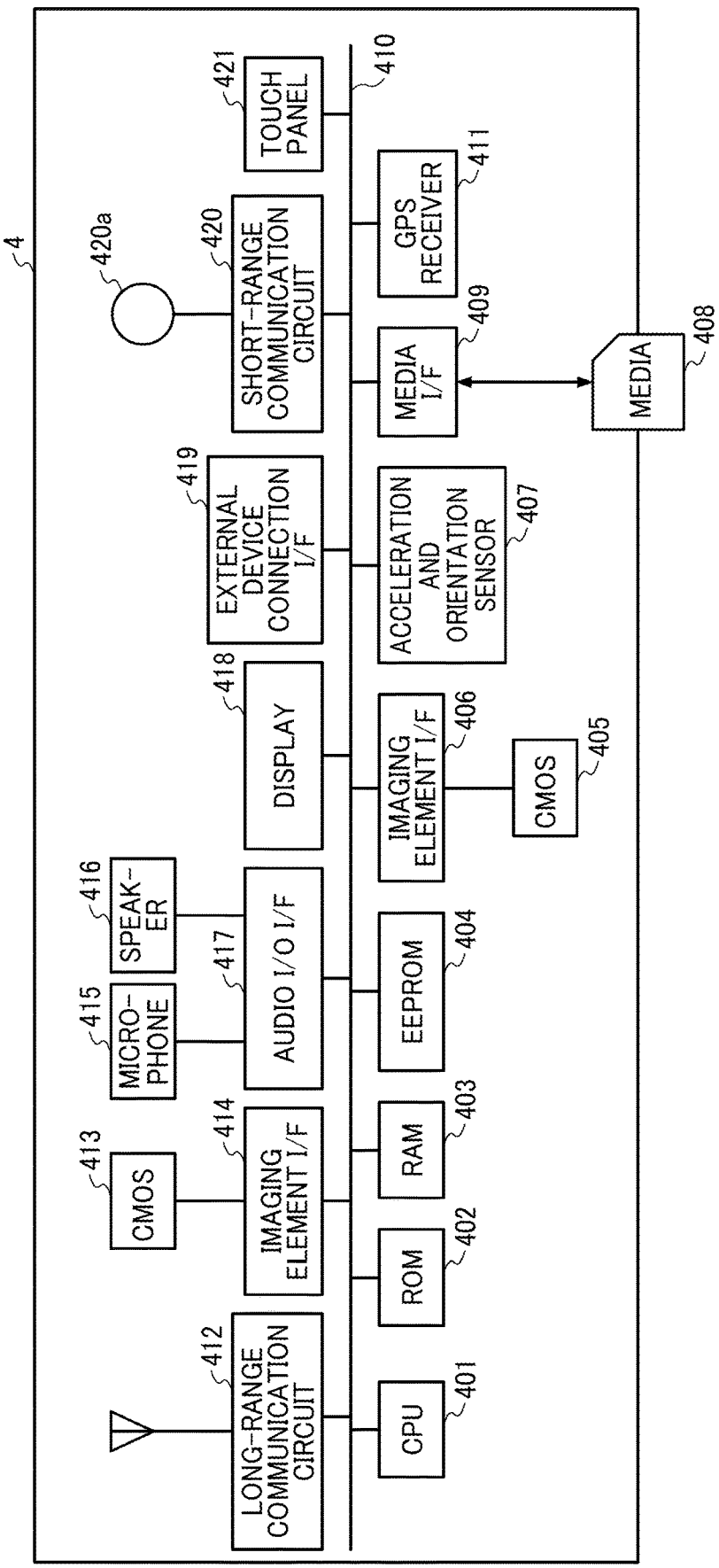
FIG. 3 is a block diagram illustrating a hardware configuration of an information terminal according to some embodiments of the present disclosure.

FIG. 3 is a diagram illustrating a hardware configuration of the information terminal 4 according to the present embodiment of the present disclosure. As illustrated in FIG. 3, the information terminal 4 such as the smartphone includes a CPU 401, a ROM 402, a RAM 403, an electrically erasable and programmable ROM (EEPROM) 404, a complementary metal oxide semiconductor (CMOS) sensor 405, an imaging element I/F 406, an acceleration and orientation sensor 407, a medium I/F 409, and a global positioning system (GPS) receiver 411.

The CPU 401 controls operations of the entire information terminal 4. The ROM 402 stores a program such as an initial program loader (IPL) used for driving the CPU 401. The RAM 403 is used as a work area for the CPU 401. The EEPROM 404 reads or writes various kinds of data such as a program for the information terminal 4 under control of the CPU 401. The CMOS sensor 405 is an example of a built-in imaging element that captures an image of a subject (mainly a self-image) under control of the CPU 401 to obtain image data. Note that an alternative to the CMOS sensor 405 may be an imaging element such as a charge-coupled device (CCD) sensor. The imaging element I/F 406 is a circuit that controls driving of the CMOS sensor 405. Examples of the acceleration and orientation sensor 407 include an electromagnetic compass or gyrocompass that detects geomagnetism and an acceleration sensor. The medium I/F 409 controls reading or writing (storing) of data from or to a recording medium 408 such as a flash memory. The GPS receiver 411 receives a GPS signal from a GPS satellite.

The information terminal 4 further includes a long-range communication circuit 412, a CMOS sensor 413, an imaging element I/F 414, a microphone 415, a speaker 416, an audio input/output I/F 417, a display 418, an external device connection I/F 419, a short-range communication circuit 420, an antenna 420a for the short-range communication circuit 420, and a touch panel 421.

The long-range communication circuit 412 is a circuit that enables the information terminal 4 to communicate with another device via the communication network 2. The CMOS sensor 413 is an example of a built-in imaging element that captures a subject under control of the CPU 401 to obtain image data. The imaging element I/F 414 is a circuit that controls driving of the CMOS sensor 413. The microphone 415 is a built-in circuit that converts sound into an electric signal. The speaker 416 is a built-in circuit that generates sound such as music or voice by converting an electric signal into physical vibration. The audio input/output I/F 417 is a circuit that inputs and outputs an audio signal between the microphone 415 and the speaker 416 under control of the CPU 401. The display 418 is an example of a display device that displays an image of the subject, various icons, etc. Examples of the display 418 include a liquid crystal display (LCD) and an organic electroluminescence (EL) display. The external device connection I/F 419 is an interface that connects various external devices to the information terminal 4. The short-range communication circuit 420 is a communication circuit that is compliant with Near Field Communication (NFC), Bluetooth®, or the like. The touch panel 421 is an example of an input device that allows a user to operate the information terminal 4 by pressing the display 418.

The information terminal 4 also includes a bus line 410. The bus line 410 is, for example, an address bus or a data bus for electrically connecting the components such as the CPU 401 illustrated in FIG. 3 to one another.

Functions

Figure 4:
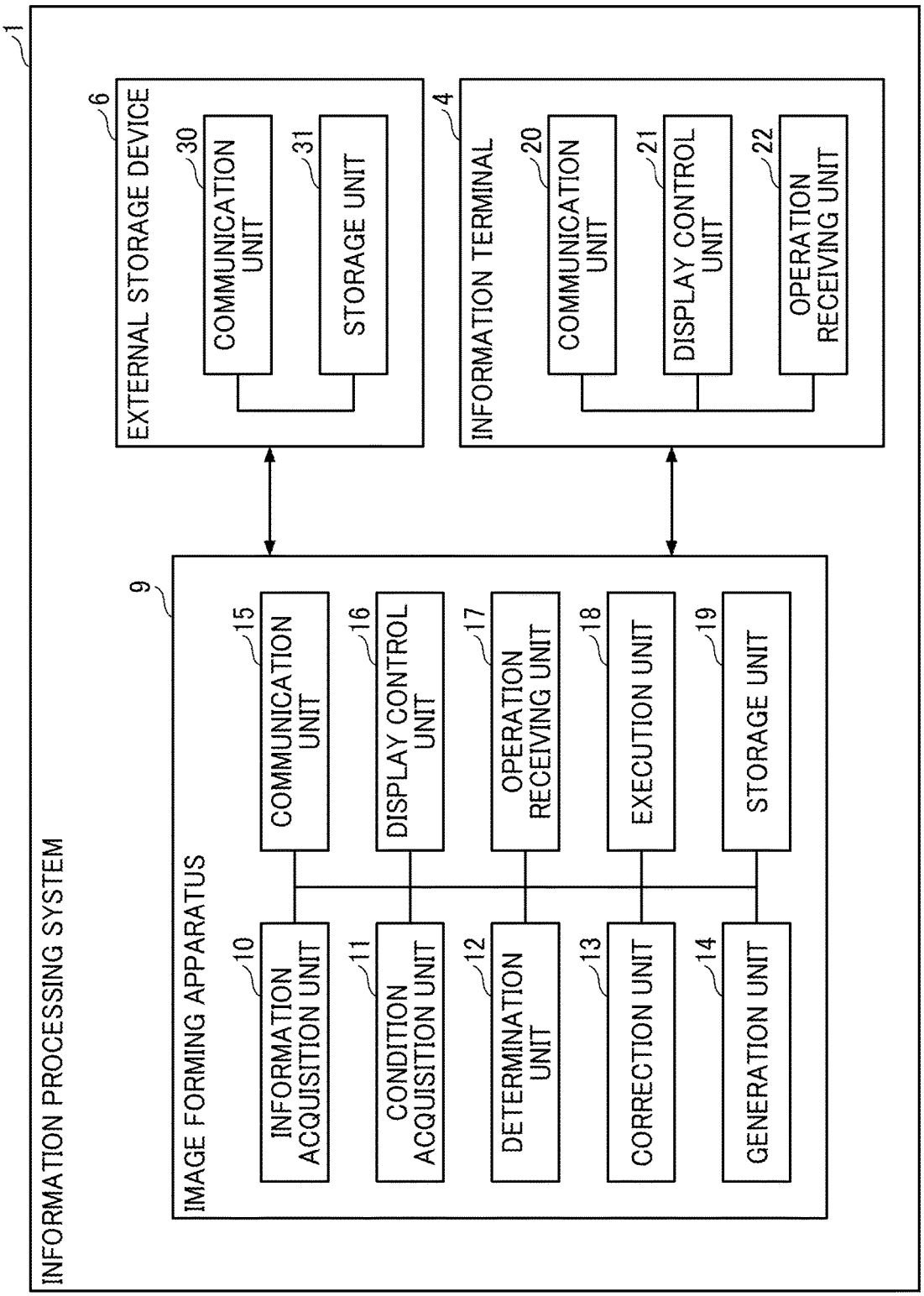
FIG. 4 is a block diagram illustrating a functional configuration of an information processing system according to some embodiments of the present disclosure.

FIG. 4 is a block diagram illustrating a functional configuration of the information processing system 1 according to the present embodiment of the present disclosure. The image forming apparatus 9 includes an information acquisition unit 10, a condition acquisition unit 11, a determination unit 12, a correction unit 13, a generation unit 14, a communication unit 15, a display control unit 16, an operation receiving unit 17, an execution unit 18, and a storage unit 19. These functional units are functions or units that are implemented as a result of the CPU 901 executing commands included in one or more programs installed on the image forming apparatus 9. The storage unit 19 may be implemented by, for example, a storage device such as the HD 909 included in the image forming apparatus 9.

The information acquisition unit 10 acquires output information of printing from image information such as a two-dimensional code scanned by the image forming apparatus 9 or captured by the camera of the information terminal 4.

The condition acquisition unit 11 acquires setting conditions related to printing functions of the image forming apparatus 9 and the peripheral device 5 connected to the image forming apparatus 9. The condition acquisition unit 11 also acquires information related to a privilege of a logged-in user of the image forming apparatus 9 to use the printing functions. The condition acquisition unit 11 further acquires setting conditions related to printing functions of another image forming apparatus 9 connected to the communication network 2 and a peripheral device 5 connected to the other image forming apparatus 9.

The determination unit 12 determines whether to correct the output information (whether correction is to be made) on the basis of the output information of printing acquired by the information acquisition unit 10 and the setting conditions acquired by the condition acquisition unit 11. The determination unit 12 checks whether the output information includes a required print setting (referred to as a required setting), checks whether the user has a privilege to use a function related to the required setting, and checks whether the required setting is settable in the image forming apparatus 9.

The correction unit 13 corrects the output information of printing acquired by the information acquisition unit 10 on the basis of the setting conditions acquired by the condition acquisition unit 11 and a determination result obtained by the determination unit 12.

The generation unit 14 generates, on the basis of the output information, screen information such as a selection screen that allows the user to select an output pattern.

The communication unit 15 is a communication function of the image forming apparatus 9 and performs transmission and reception of information between the image forming apparatus 9 and the information terminal 4 via the communication network 2.

The display control unit 16 causes the touch panel 940a of the image forming apparatus 9 to display the selection screen that allows the user to select an output pattern on the basis of the screen information generated by the generation unit 14.

The operation receiving unit 17 receives a user operation such as input of text or pressing of a button via the touch panel 940a of the image forming apparatus 9. For example, the operation receiving unit 17 receives a user operation of inputting a user ID and a password when the user logs into the image forming apparatus 9. The operation receiving unit 17 receives a user operation of selecting an output pattern on the selection screen for selecting an output pattern of printing. Alternatively, in the case of a single output pattern, the operation receiving unit 17 receives a user operation of requesting execution of printing.

The execution unit 18 executes printing on the basis of a print setting corresponding to the output pattern selected by the user.

The storage unit 19 stores, as setting conditions, identifiers indicating printing functions of the image forming apparatus 9 and the peripheral device 5 and information related to a privilege of a user who can log into the image forming apparatus 9 to use the printing functions in the storage device of the image forming apparatus 9. The storage unit 19 also stores a file such as a document file to be printed in the storage device of the image forming apparatus 9.

The information terminal 4 includes a communication unit 20, a display control unit 21, and an operation receiving unit 22. These functional units are functions or units that are implemented as a result of the CPU 401 executing commands included in one or more programs installed on an information processing apparatus that serves as the information terminal 4.

The communication unit 20 is a communication function of the information terminal 4 and performs transmission and reception of information with the image forming apparatus 9 via the communication network 2.

The display control unit 21 causes the touch panel 421 of the information terminal 4 to display the selection screen that allows the user to select an output pattern on the basis of the screen information received from the image forming apparatus 9.

The operation receiving unit 22 receives a user operation such as input of text or pressing of a button via the touch panel 421 of the information terminal 4. For example, the operation receiving unit 22 receives a user operation of inputting a user ID and a password when the user logs into the image forming apparatus 9. The operation receiving unit 22 receive a user operation of selecting an output pattern on the selection screen for selecting an output pattern of printing.

An external storage device 6 includes a communication unit 30 and a storage unit 31.

The communication unit 30 is a communication function of the external storage device 6 and performs transmission and reception of information with the image forming apparatus 9 via the communication network 2.

The storage unit 31 stores a file such as a document file to be printed in a storage device such as a hard disk of the external storage device 6.

Printing Execution Process Based on Acquired Image Information

Figure 5:
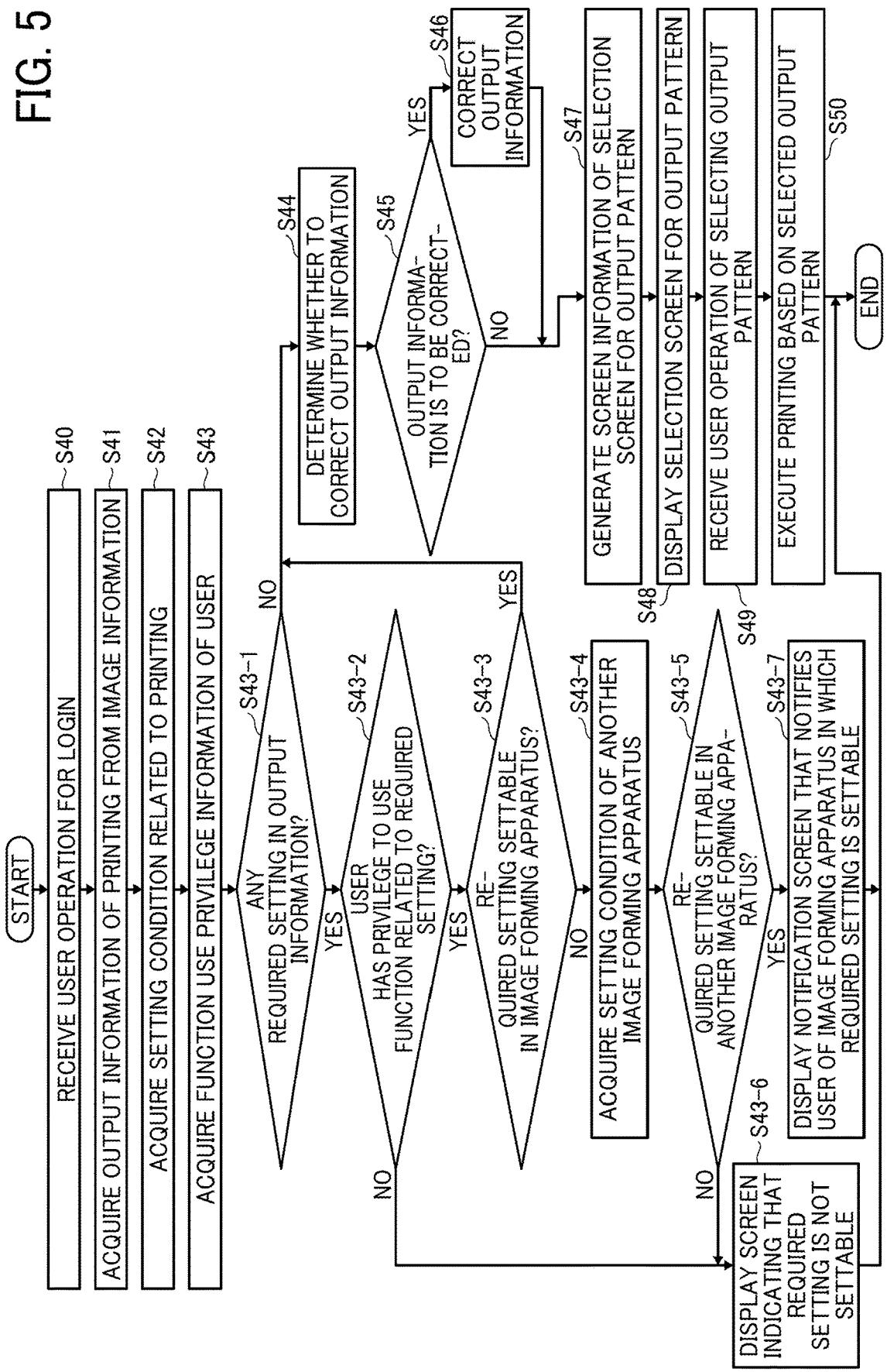
FIG. 5 is a flowchart of a printing execution process based on acquired image information according to some embodiments of the present disclosure.

FIG. 5 is a flowchart of a printing execution process based on the acquired image information according to the present embodiment of the present disclosure. Each processing step in FIG. 5 will be described below.

Step S40: The operation receiving unit 17 of the image forming apparatus 9 receives, via the touch panel 940a of the image forming apparatus 9, a user operation of inputting a user ID and a password, which is performed by a user to log into the image forming apparatus 9. After the login is completed, the operation receiving unit 17 receives a user operation to use a function of easily executing printing.

Figure 6:
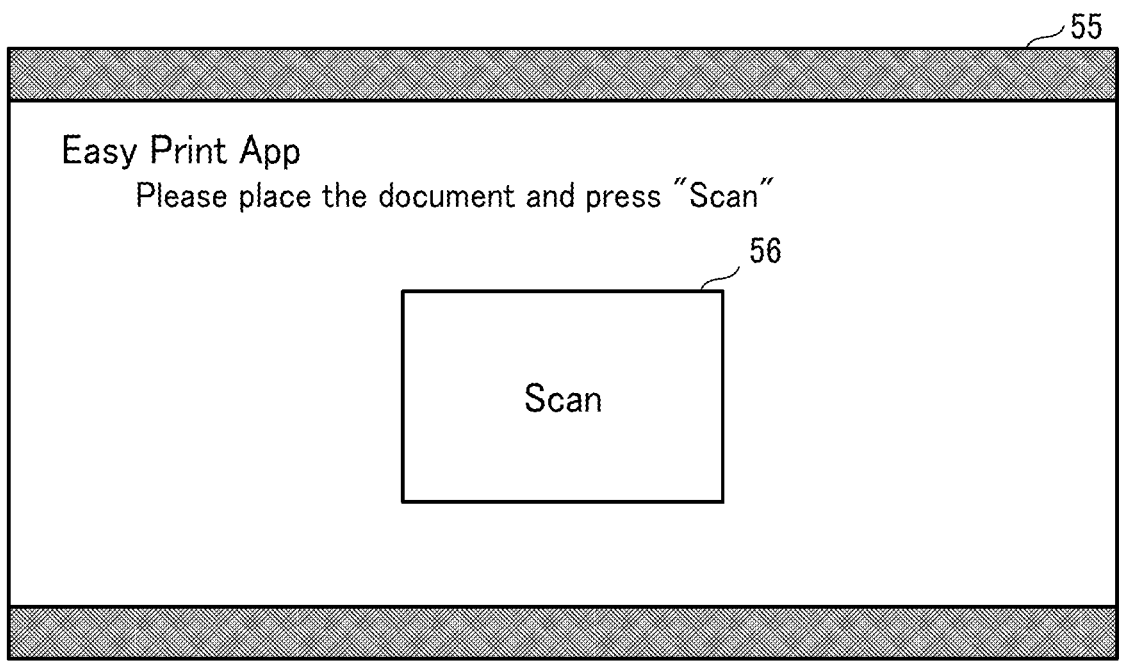
FIG. 6 is a diagram illustrating an image information acquisition screen according to some embodiments of the present disclosure.

Step S41: The display control unit 16 of the image forming apparatus 9 causes the touch panel 940a of the image forming apparatus 9 to display a screen that prompts the user to use the scan function of the image forming apparatus 9 to scan the image information including the output information of printing. FIG. 6 is a diagram illustrating an image information acquisition screen (acquisition screen) for acquiring the image information according to the present embodiment of the present disclosure. An acquisition screen 55 of FIG. 6 displays a message ("Please place the document and press [Scan].") that prompts the user to use the scan function of the image forming apparatus 9 to scan the image information including the output information of printing. The acquisition screen 55 also displays a button 56 to be pressed to start a scan. The operation receiving unit 17 of the image forming apparatus 9 receives a user operation of pressing the button 56. The information acquisition unit 10 of the image forming apparatus 9 acquires the output information of printing from the image information obtained by scanning.

Figure 7:
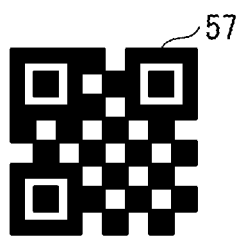
FIG. 7 is a diagram illustrating image information (two-dimensional code) according to some embodiments of the present disclosure.

FIG. 7 is a diagram illustrating the image information (two-dimensional code) according to the present embodiment of the present disclosure. Image information 57 illustrated in FIG. 7 is a two-dimensional code including the output information of printing. Alternatively, the image information may be a one-dimensional code (barcode).

FIGS. 8A and 8B are diagrams for describing the output information included in the image information according to the present embodiment of the present disclosure. Output information 60 of FIG. 8A has a structure including repeated sets of a "key" indicating a type of information and a value corresponding to the "key" that are separated by comma ",". One or more values may correspond to one type of "key." As illustrated in an explanatory table 61 of the output information in FIG. 8B, the types of the "key" include "url" indicating the storage location of a file to be printed, "pattern" indicating an output pattern, "required" indicating a required print setting, and "setting" indicating a recommended print setting. The value of the key "url" is a uniform resource locator (URL) indicating the storage location of a document file. The values of the key "pattern" include "simple" which is a pattern of printing the document simply and "detail" which is a pattern of printing the document in detail. The values of the key "required" include "prn_color" indicating color printing and "duplex" indicating duplex printing. The values of the key "setting" include "prn_mono" indicating monochrome printing, "prn_color" indicating color printing, "duplex" indicating duplex printing, "staple" indicating execution of stapling, and a value designating pages to be printed. For example, the pages to be printed are indicated such that pages 1 to 2 are printed in the case of the value of "1-2" and all pages are printed in the case of the value "1-. Referring back to FIG. 5, the description is continued.

Step S42: The condition acquisition unit 11 of the image forming apparatus 9 acquires setting conditions related to printing functions of (i.e., usable in) the image forming apparatus 9 and the peripheral device 5 connected to the image forming apparatus 9. Specifically, for example, the storage unit 19 of the image forming apparatus 9 stores in advance, in the storage device of the image forming apparatus 9, information including identifiers indicating printing functions usable in the image forming apparatus 9 and the peripheral device 5 as part of the setting conditions. Alternatively, the storage unit 19 may store, for each function, information indicating whether the image forming apparatus 9 and the peripheral device 5 have the function instead of storing the identifiers of the usable functions.

The condition acquisition unit 11 reads the setting conditions stored in the storage device of the image forming apparatus 9 to acquire the setting condition related to the printing function. Identifiers indicating the printing function and other functions of the image forming apparatus 9 and the peripheral device 5 will be described below.

FIG. 9 is a diagram for describing functions of the image forming apparatus according to the present embodiment of the present disclosure. A function list 62 illustrated in FIG. 9 includes items of functions of the image forming apparatus 9, a decryption about each function, and an identifier indicating each function. As indicated by the function list 62, the functions of the image forming apparatus 9 includes, as large categories, "print," "copy," "fax," and "scanner." "Print" includes a function "color" that enables color printing and a function "monochrome" that enables monochrome printing. "Copy" also includes four types of functions according to usable colors. Each of the functions is assigned an identifier indicating the function. For example, an identifier indicating the "color" printing function is "prn_color," and an identifier indicating the "monochrome" printing function is "prn_mono."

FIG. 10 is a diagram for describing functions of the peripheral device according to the present embodiment of the present disclosure. A function list 63 illustrated in FIG. 10 includes items of functions of the peripheral device 5, a decryption about each function, and an identifier indicating each function. As indicated by the function list 63, the functions of the peripheral device 5 include "staple," "punch," "sheet folding," "single-sided printing," "duplex printing," and "charging." Identifiers indicating these functions are "staple," "punch," "fold," "single-sided," "duplex," and "charge." The "charging" function is a function displaying information related to the use of each function set for the function. The information related to the use of each function is, for example, an amount charged for the use. The setting condition for the "charging" function may include, in addition to an identifier indicating that a function is usable, information related to a charge for printing such as 20 yen per page for color printing or 10 yen per page for monochrome printing, for example, as the information related to the use of the function. The storage unit 19 of the image forming apparatus 9 may store the information related to a charge for printing such that the information is appended to the identifier indicating the function, for example, "prn_mono:10." Referring back to FIG. 5, the description is continued.

Step S43: The condition acquisition unit 11 of the image forming apparatus 9 acquires information related to a privilege of the logged-in user of the image forming apparatus 9 to use a function. Specifically, for example, the storage unit 19 of the image forming apparatus 9 stores in advance, as part of the setting condition in the storage device of the image forming apparatus 9, information related to a privilege of a user who can log into the image forming apparatus 9 to use a function. The condition acquisition unit 11 reads the setting condition stored in the storage device of the image forming apparatus 9 to acquire the information related to the privilege of the user to use the function. FIG. 11 is a diagram illustrating the information related to the privilege of the user to use a function according to the present embodiment of the present disclosure. Use privilege information 64 illustrated in FIG. 11 presents the information related to the privilege of a user who can log into the image forming apparatus 9 to use a function. The use privilege information 64 displays, as a privilege of a user with a user ID "user1" to use a function, identifiers "prn_color," "cpy_color," and "scan" indicating usable functions, for example. That is, the user with the user ID "user1" has a privilege to use color printing, color copy, and scan functions. The condition acquisition unit 11 may acquire the privilege of the logged-in user to use of the function related to printing (printing function). That is, the condition acquisition unit 11 acquires information related to functions such as "prn_color" and "cpy_color" but does not acquire information related to functions such as "fax" and "scan." Referring back to FIG. 5, the description is continued.

Step S43-1: The determination unit 12 of the image forming apparatus 9 checks whether the output information acquired by the information acquisition unit 10 in step S41 includes the required print setting (referred to as required setting) of which the key illustrated in FIG. 8B is "required." If the output information includes the required setting, the process proceeds to step S43-2. If the output information does not include the required setting, the process proceeds to step S44.

Step S43-2: The determination unit 12 of the image forming apparatus 9 checks whether the user has a privilege to use the function related to the required setting included in the output information, on the basis of the information related to the use privilege acquired by the condition acquisition unit 11 in step S43. If the user has a privilege to use the function, the process proceeds step S43-3. If the user does not have a privilege to use the function, the process proceeds to step S43-6.

Step S43-3: The determination unit 12 of the image forming apparatus 9 checks whether the required setting included in the output information is settable in the image forming apparatus 9, on the basis of the setting condition acquired by the condition acquisition unit 11 in step S42. If the required setting is settable, the process proceeds to step S44. If the required setting is not settable, the process proceeds to step S43-4.

Step S43-4: The condition acquisition unit 11 of the image forming apparatus 9 acquires a setting condition (referred to as an additional setting condition) related to the printing functions of at least one other image forming apparatus 9 connected to the communication network 2 and a peripheral device 5 connected to the at least one other image forming apparatus 9. An application programming interface (API) for sharing the setting condition among the plurality of image forming apparatuses 9 via the communication network 2 may be defined.

Step S43-5: The determination unit 12 of the image forming apparatus 9 checks whether the required setting included in the output information is settable in the other image forming apparatus 9, on the basis of the additional setting condition. If the required setting is settable, the process proceeds to step S43-7. If the required setting is not settable, the process proceeds to step S43-6.

Step S43-6: The generation unit 14 of the image forming apparatus 9 generates a notification screen that notifies the user that printing is not executable because the required print setting is not settable in the image forming apparatus 9 to which the user has logged in. The display control unit 16 of the image forming apparatus 9 causes the touch panel 940a of the image forming apparatus 9 to display the notification screen generated by the generation unit 14.

Figure 15:
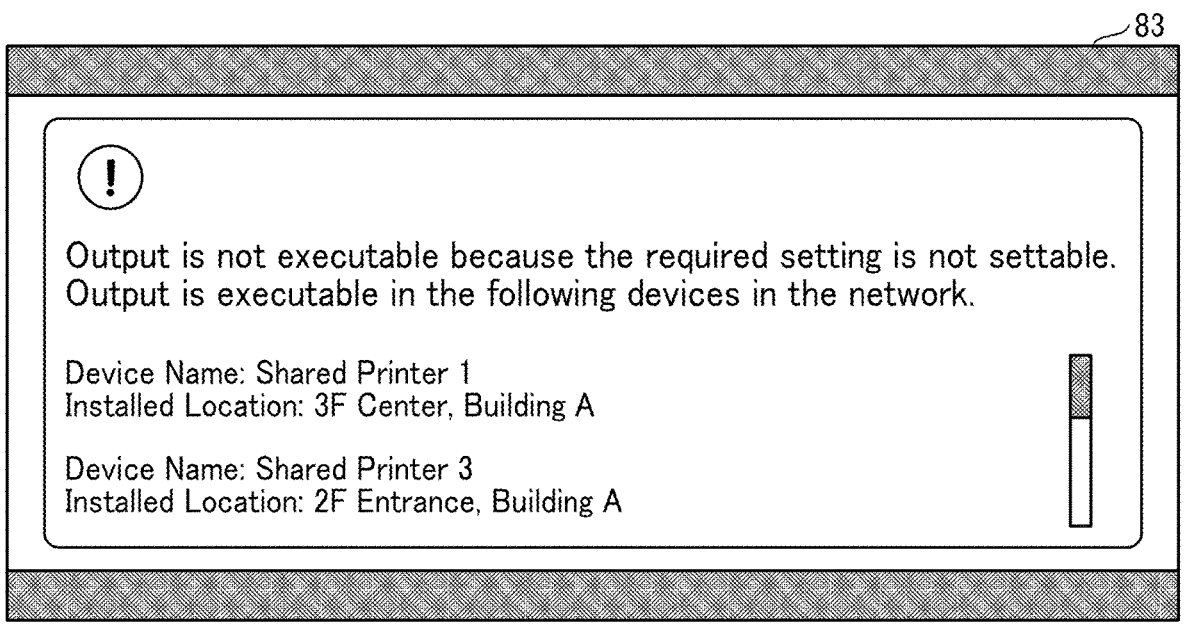
FIG. 15 is a diagram illustrating a notification screen that provides a notification about image forming apparatuses in which a required setting is settable according to some embodiments of the present disclosure.

Step S43-7: The generation unit 14 of the image forming apparatus 9 generates a notification screen that notifies the user that printing is not executable because the required print setting is not settable in the image forming apparatus 9 to which the user has logged in and notifies the user of information on another image forming apparatus 9 that is connected to the communication network 2 and in which printing is executable. The display control unit 16 of the image forming apparatus 9 causes the touch panel 940a of the image forming apparatus 9 to display the notification screen generated by the generation unit 14. FIG. 15 is a diagram illustrating a notification screen that provides a notification about image forming apparatuses in which the required setting is settable according to the present embodiment of the present disclosure. A notification screen 83 of FIG. 15 displays a message ("Output is not executable because the required setting is not settable.") notifying the user that printing is not executable because the required print setting is not settable in the image forming apparatus 9 to which the user has logged in. The notification screen 83 also displays a message "Output is executable in the following devices in the network.") notifying the user that other image forming apparatuses 9 in which the required print setting is settable and thus printing is executable are usable. The notification screen 83 further displays, as apparatus information related to the usable image forming apparatuses 9,
device names (shared printer 1 and shared printer 3) and installed locations (3F Center, Building A and 2F Entrance, Building A).

Step S44: The determination unit 12 of the image forming apparatus 9 determines whether to correct the output information (whether correction is to be made) on the basis of the output information of printing acquired by the information acquisition unit 10 and the setting condition acquired by the condition acquisition unit 11. FIGS. 12A, 12B, and 12C are diagrams for describing a determination of whether to correct the output information according to the present embodiment of the present disclosure. A setting condition 70 of FIG. 12A is a setting condition related to the printing function and acquired by the condition acquisition unit 11 in step S42. The setting condition 70 includes identifiers of functions related to printing (usable functions) of the image forming apparatus 9 and the peripheral device 5, which are "prn_color," "prn_mono," "staple," and "single-sided." Use privilege information 71 of FIG. 12B is information related to a privilege of the logged-in user of the image forming apparatus 9 to use a function, acquired by the condition acquisition unit 11 in step S43. The use privilege information 71 includes identifiers of functions which a user with a user ID "user2" has a privilege to use, which are "prn_mono," "single_sided," "cpy_twin," "fax," and "scan." Among these identifiers, identifiers of functions related to printing are "prn_mono" and "single_sided."

Output information 72 of FIG. 12C displays the "key," the "means of key," and the value corresponding to the "key" in the output information acquired by the information acquisition unit 10 in step S41. The determination unit 12 checks whether both the setting condition 70 and the use privilege information 71 include the printing function indicated by the value corresponding to "setting" which is the type of "key" in the output information 72 to determine that whether to correct the output information 72. That is, both the setting condition 70 and the use privilege information 71 include the printing function included in the output information 72, the determination unit 12 determines that the output information 72 is not to be corrected. Otherwise, the determination unit 12 determines that the output information 72 is to be corrected. Referring back to FIG. 5, the description is continued.

Step S45: If the determination unit 12 of the image forming apparatus 9 determines in step S44 that the output information 72 is to be corrected, the process proceeds to step S46. Otherwise, the process proceeds to step S47.

Step S46: The correction unit 13 of the image forming apparatus 9 corrects the output information of printing acquired by the information acquisition unit 10, on the basis of the setting condition acquired by the condition acquisition unit 11. For example, the correction unit 13 corrects the value corresponding to the "key" which indicates the type of the printing function in the output information 72 and is not included in either the setting condition 70 or the use privilege information 71 of FIG. 12B or is included in neither the setting condition 70 nor the use privilege information 71. Specifically, the correction unit 13 corrects duplex printing (with the identifier "duplex") and color printing (with the identifier "prn_color") in the output information 72 to single-sided printing (with the identifier "single-sided") and monochrome printing (with the identifier "prn_mono"), respectively. FIG. 13 is a diagram for describing correction of the output information according to the present embodiment of the present disclosure. In corrected output information 73 of FIG. 13, the values "duplex" and "prn_color" of the original output information 72 of FIG. 12C are corrected to "single-sided" and "prn_mono," respectively. As described above, in terms of the printing function in the output information 73, the correction unit 13 corrects a function not usable in the image forming apparatus 9 or the peripheral device 5 or a function which the user does not have a privilege to use, to a function that is usable in the image forming apparatus 9 or the peripheral device 5 and which the user has a privilege to use. Alternatively, if the function such as punch and sheet folding is not usable in the image forming apparatus 9 or the peripheral device 5 or the user has not have a privilege to use such a function, the correction unit 13 may delete the "key" and the value corresponding to the "key" from the output information 73 to correct the output information 73. Referring back to FIG. 5, the description is continued.

Step S47: The generation unit 14 of the image forming apparatus 9 generates, on the basis of the output information, screen information of a selection screen that allows the user to select an output pattern.

Figure 14:
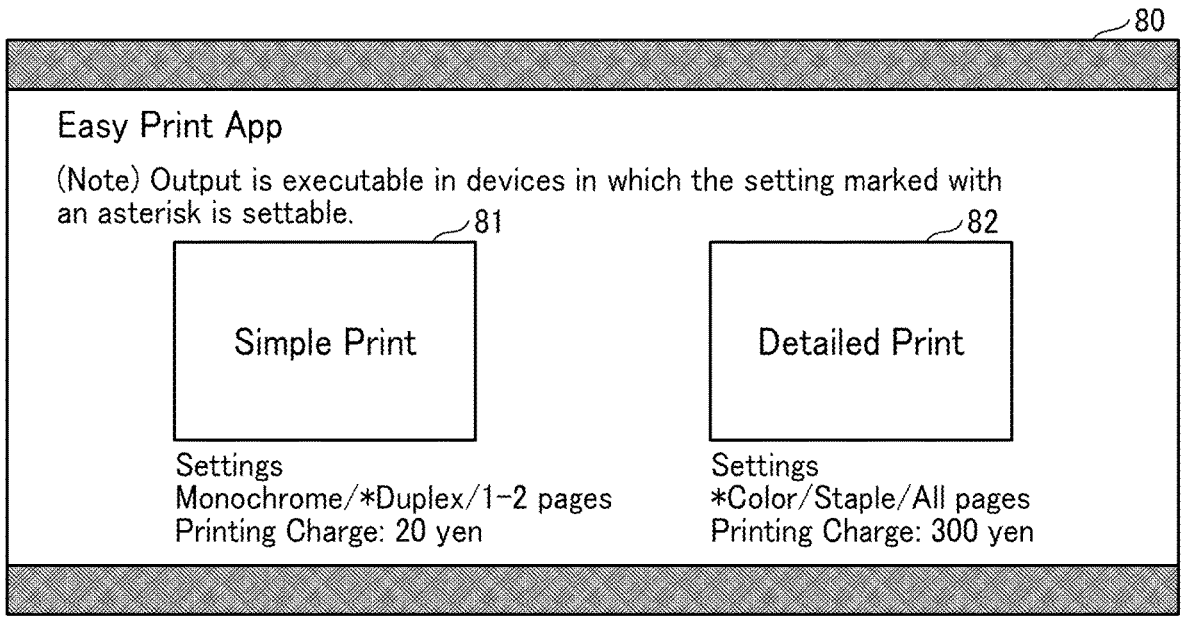
FIG. 14 is a diagram illustrating a selection screen of an output pattern of printing according to some embodiments of the present disclosure.

Step S48: The display control unit 16 of the image forming apparatus 9 causes the touch panel 940a of the image forming apparatus 9 to display the selection screen that allows the user to select an output pattern, on the basis of the screen information generated by the generation unit 14 in step S47. FIG. 14 is a diagram illustrating a selection screen of an output pattern of printing according to the present embodiment of the present disclosure. A selection screen 80 of FIG. 14 displays buttons 81 and 82 which allow a user to select one of two output patterns to execute simple printing or detailed printing. The selection screen 80 also displays settings related to printing and a charge for printing in the respective output patterns below the buttons 81 and 82. The selection screen 80 also displays a message ("(Note) Output is executable in devices in which the setting marked with an asterisk is settable.") indicating that printing is executable in the image forming apparatus 9 in which the setting of "duplex" or "color" is settable. Referring back to FIG. 5, the description is continued.

Step S49: The operation receiving unit 17 of the image forming apparatus 9 receives a user operation of selecting an output pattern (e.g., an operation of pressing the button 81 or 82 of FIG. 14).

Step S50: The execution unit 18 of the image forming apparatus 9 executes printing, on the basis of the print settings corresponding to the output pattern selected by the user in step S49. When the storage device of the external storage device 6 stores a file to be printed, the communication unit 15 of the image forming apparatus 9 receives the file to be printed from the communication unit 30 of the external storage device 6 before execution of printing.

As a result of the process described above, the information processing system 1 allows the user to select an output pattern displayed in the selection screen displayed by the image forming apparatus 9, and thus can execute printing without the user making detailed print settings. Alternatively, when one type of output pattern is present, the image forming apparatus 9 may allow the user to request execution of printing with the one type of output pattern instead of displaying the selection screen. When the output information includes a required print setting and the required print setting is not settable in the image forming apparatus 9, namely, when the required print setting is unavailable in the image forming apparatus 9, the information processing system 1 may cause the touch panel 940a of the image forming apparatus 9 to display a notification screen including a message notifying the user that the required print setting is not settable and information on other image forming apparatuses 9 in which the required print setting is settable and printing is executable.

Modification

A case where the user performs an operation via the touch panel 421 of the information terminal 4 instead of the touch panel 940a of the image forming apparatus 9 will be described as a modification of the above-described embodiment of the present disclosure. The description is given mainly of processing different from the processing described in the flowchart of FIG. 5. The information terminal 4 is connected to and ready to communicate with the image forming apparatus 9 by, for example, short-range communication such as Bluetooth®.

Step S40: The operation receiving unit 22 of the information terminal 4 receives, via the touch panel 421 of the information terminal 4, a user operation of inputting a user ID and a password, which is performed by a user to log into the image forming apparatus 9. The communication unit 20 of the information terminal 4 transmits a login request including the user ID and the password to the communication unit 15 of the image forming apparatus 9. After the completion of the login, the operation receiving unit 22 receives a user operation of using the simple printing function on a menu screen.

Step S41: The display control unit 21 of the information terminal 4 causes the touch panel 421 of the information terminal 4 to display a screen that prompts the user to use the camera of the information terminal 4 to capture the image information printed on a sheet. The operation receiving unit 22 of the information terminal 4 receives an operation of capturing the image information printed on the sheet with the camera of the information terminal 4, in accordance with an instruction given on the screen from the user. The communication unit 20 of the information terminal 4 transmits the image information to the communication unit 15 of the image forming apparatus 9. The information acquisition unit 10 of the image forming apparatus 9 acquires the output information of printing from the received image information. Note that the image information may be image information acquired by another method such as the user downloading the image information with the information terminal 4 instead of the image information captured by the user with the camera of the information terminal 4.

Processing of steps S42 to S47 is the same as that of the embodiment described above.

Step S48: The display control unit 16 of the image forming apparatus 9 transmits the screen information generated by the generation unit 14 in step S47 to the communication unit 20 of the information terminal 4. The display control unit 16 of the information terminal 4 causes the touch panel 421 of the information terminal 4 to display the selection screen that allows the user to select an output pattern, on the basis of the received screen information.

Step S49: The operation receiving unit 22 of the information terminal 4 receives a user operation of selecting an output pattern. The communication unit 20 of the information terminal 4 transmits information related to the output pattern selected by the user to the communication unit 15 of the image forming apparatus 9.

Processing of step S50 is the same as that in the embodiment described above. In the procedure similar to that of steps S48 and S49, the notification screen displayed in steps S43-6 and S43-7 may be displayed on the touch panel 421 of the information terminal 4.

As a result of the process described above, the information processing system 1 allows the user to select an output pattern displayed in the selection screen displayed on the touch panel 421 of the information terminal 4, and thus can execute printing without the user making detailed print settings. When the output information includes a required print setting and the required print setting is not settable (unavailable) in the image forming apparatus 9, the information processing system 1 may cause the touch panel 421 of the information terminal 4 to display a notification screen including a message notifying the user that the required print setting is not settable and information on other image forming apparatuses 9 in which the required print setting is settable and printing is executable.

While some embodiments of the present disclosure have been described above, such embodiments do not limit the present disclosure in any way. Various modifications and replacements may be made within a scope not departing from the gist of the present disclosure.

For example, an example of the block diagram of the functional configuration illustrated in FIG. 4 presents blocks obtained by dividing major functions to make it easier to understand the processes performed by the information processing system 1 and the image forming apparatus 9. No limitation is intended by how the functions are divided by process or by the name of the functions. The processes implemented by the information processing system 1 and the image forming apparatus 9 may be divided to a larger number of processes depending on the contents of processes. In addition, the division may be performed so that one processing unit contains more processing.

Each of the functions of the embodiment described above may be implemented by one or more processing circuits or circuitry. As used herein, the term "processing circuit or circuitry" includes a processor programmed to implement each function by software, such as a processor implemented by an electronic circuit, and devices designed to implement the functions described above, such as an application specific integrated circuit (ASIC), a digital signal processor (DSP), a field programmable gate array (FPGA), and existing circuit modules.

The apparatuses or devices described in the embodiment are merely one example of plural computing environments that implement the embodiment disclosed herein. In some embodiments, the information processing system 1 and the image forming apparatus 9 include multiple computing devices, such as a server cluster. The plural computing devices communicate with one another through any type of communication link including a network, shared memory, etc., and perform the processes disclosed herein.

For example, aspects of the present disclosure are as described below.

In Aspect 1, an image forming apparatus includes an information acquisition unit, a condition acquisition unit, a determination unit, a correction unit, an operation receiving unit, and an execution unit. The information acquisition unit acquires output information of printing from image information. The condition acquisition unit acquires a setting condition related to a usable printing function. The determination unit determines whether to correct the output information, based on the setting condition. The correction unit corrects the output information, based on a determined result of the determination unit and the setting condition. The operation receiving unit receives an operation of requesting execution of printing from a user. The execution unit executes printing, based on the output information and a request from the user.

According to Aspect 2, in the image forming apparatus of Aspect 1, the image information includes information related to a storage location of a file to be printed, and the information acquisition unit acquires, as part of the output information, the information related to the storage location of the file from the image information.

According to Aspect 3, in the image forming apparatus of Aspect 1 or 2, the image information includes information related to a plurality of output patterns of printing, and the information acquisition unit acquires, as part of the output information, the information related to the plurality of output patterns from the image information. The image forming apparatus further includes a display control unit. The display control unit causes a selection screen to be displayed that allows selection of an output pattern among the plurality of output patterns. The operation receiving unit receives an operation of selecting an output pattern among the plurality of output patterns from the user on the selection screen. The execution unit executes printing, based on the output pattern selected by the user.

According to Aspect 4, in the image forming apparatus of Aspect 3, the image information includes information related to a printing function to be used in each of the plurality of output patterns.

According to Aspect 5, in the image forming apparatus of any one of Aspects 1 to 4, the usable printing function includes a function of a peripheral device connected to the image forming apparatus.

According to Aspect 6, in the image forming apparatus of Aspect 3 or 4, the usable printing function includes a function related to charging, and the display control unit displays, for each of the plurality of output patterns, a charge for printing.

According to Aspect 7, in the image forming apparatus of any one of Aspects 1 to 6, the setting condition includes information related to a privilege of the user to use a printing function.

According to Aspect 8, in the image forming apparatus of Aspect 1, the output information includes information indicating a required setting for which correction of the output information is prohibited.

According to Aspect 9, in the image forming apparatus of Aspect 8, in a case where the required setting is unavailable in the image forming apparatus, the condition acquisition unit acquires an additional setting condition related to a printing function usable in another image forming apparatus, the determination unit determines whether the required setting is settable in said another image forming apparatus, based on the additional setting condition. The image forming apparatus further includes a display control unit. The display control unit causes apparatus information to be displayed in a notification screen for the user, the apparatus information being for identifying said another image forming apparatus in which the required setting is settable.

According to Aspect 10, in the image forming apparatus of Aspect 9, the apparatus information includes information related to an installed location of said another image forming apparatus in which the required setting is settable.

In the related art, detailed settings in an image forming apparatus are made according to a user operation when printing is executed with the image forming apparatus.

According to one or more embodiments, printing can be executed with an image forming apparatus without making detailed settings according to a user operation.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:
1. An image forming apparatus comprising:
an image forming device; and
circuitry configured to:
scan image information that is a code printed on a sheet;
acquire output information of printing from the image information;
acquire a setting condition related to a usable printing function;
determine whether to correct the output information, based on the setting condition;
correct the output information, based on a determined result and the setting condition;
receive an operation of requesting execution of printing from a user;
cause the image forming device to execute printing, based on the output information and a request from the user;
acquire privilege information related to a privilege of the user, the privilege allowing the user to use the printing function; and
determine whether to correct the output information by checking whether both the setting condition and the privilege information include the printing function included in the output information.
2. The image forming apparatus according to claim 1, wherein
the image information includes information related to a storage location of a file to be printed, and
the circuitry is configured to acquire, as part of the output information, the information related to the storage location of the file from the image information.
3. The image forming apparatus according to claim 1, wherein
the image information includes information related to a plurality of output patterns of printing, and
the circuitry is configured to:
acquire, as part of the output information, the information related to the plurality of output patterns from the image information;
cause a display to display a selection screen for selecting an output pattern among the plurality of output patterns;
receive an operation of selecting the output pattern among the plurality of output patterns from the user on the selection screen; and
cause the image forming device to execute printing, based on the output pattern selected by the user.
4. The image forming apparatus according to claim 3, wherein the image information includes information related to a printing function to be used in each of the plurality of output patterns.
5. The image forming apparatus according to claim 3, wherein
the usable printing function includes a function of displaying information related to use of the usable printing function, and
the circuitry is configured to cause the display to display, for each of the plurality of output patterns, the information related to the use of the usable printing function.
6. The image forming apparatus according to claim 1, wherein the usable printing function is a function of a peripheral device connected to the image forming apparatus.
7. The image forming apparatus according to claim 1, wherein the output information includes information indicating a required setting for which correction of the output information is prohibited.
8. The image forming apparatus according to claim 7, wherein
the circuitry is configured to:
in a case where the required setting is unavailable in the image forming apparatus, acquire an additional setting condition related to a printing function usable in another image forming apparatus;
determine whether the required setting is settable in said another image forming apparatus, based on the additional setting condition; and
cause apparatus information to be displayed in a notification screen for the user, the apparatus information being for identifying said another image forming apparatus in which the required setting is settable.
9. The image forming apparatus according to claim 8, wherein the apparatus information includes information related to an installed location of said another image forming apparatus in which the required setting is settable.
10. An information processing method comprising:
scanning image information that is a code printed on a sheet;
acquiring output information of printing from the image information;
acquiring a setting condition related to a usable printing function;
determining whether to correct the output information, based on the setting condition;
correcting the output information, based on a determined result in the determining and the setting condition;
receiving an operation of requesting execution of printing from a user;
executing printing, based on the output information and a request from the user;
acquiring privilege information related to a privilege of the user, the privilege allowing the user to use the printing function; and
determining whether to correct the output information by checking whether both the setting condition and the privilege information include the printing function included in the output information.

11. A non-transitory recording medium storing a plurality of instructions which, when executed by one or more processors, cause the processors to perform the information processing method according to claim 10.

12. An image forming apparatus comprising:
an image forming device; and
circuitry configured to:
   acquire output information of printing from image information;
   acquire a setting condition related to a usable printing function;
   determine whether to correct the output information, based on the setting condition;
   correct the output information, based on a determined result and the setting condition;
   receive an operation of requesting execution of printing from a user; and
   cause the image forming device to execute printing, based on the output information and a request from the user,
wherein the output information includes information indicating a required setting for which correction of the output information is prohibited,
wherein the circuitry is further configured to:
   in a case where the required setting is unavailable in the image forming apparatus, acquire an additional setting condition related to a printing function usable in another image forming apparatus;
   determine whether the required setting is settable in said another image forming apparatus, based on the additional setting condition; and
   cause apparatus information to be displayed in a notification screen for the user, the apparatus information being for identifying said another image forming apparatus in which the required setting is settable, and
wherein the apparatus information includes information related to an installed location of said another image forming apparatus in which the required setting is settable.

* * * * *